G. PELSTRING.

Graining Machine.

No. 8,507. Reissued Nov. 26, 1878.

Attest.
Walter Knight
E. W. Bond

Inventor
Georg Pelstring
By Knight Bros.
Attys.

UNITED STATES PATENT OFFICE.

GEORGE PELSTRING, OF CINCINNATI, OHIO.

IMPROVEMENT IN GRAINING-MACHINES.

Specification forming part of Letters Patent No. 204,078, dated May 21, 1878; Reissue No. 8,507, dated November 26, 1878; application filed October 28, 1878.

*To all whom it may concern:*

Be it known that I, GEORGE PELSTRING, of Cincinnati, Hamilton county, Ohio, have invented a new and useful Wood-Graining Machine, of which the following is a specification:

My invention has for its object the imitation of the grain of the more valuable woods on the surface of a cheaper kind—as, for example, the grain of Spanish cedar upon common poplar.

The device consists, essentially, of a revolving drum or cylinder whose peripheral surface, having protuberances corresponding to the depressions of the grain of wood to be imitated, serves to impress on any board passed in contact with and pressed against it indentations resembling those of the more costly wood; but preliminary to the indentation of the lumber by the engraved surface of my said drum the said surface is caused to revolve in contact with a color-imparting apparatus. Such revolving drum, with its coloring device, in conjunction with suitable feeding and supporting or pressing mechanism, causes a board while being indented to be at the same instant and by the same act stained or colored in the indentations.

My graining apparatus in its most complete form comprises rollers for drawing or driving the lumber through the machine, rollers for abrasion of the board surface and for filling the indentations with coloring-matter, &c., and finishing-rollers.

Figure 1:
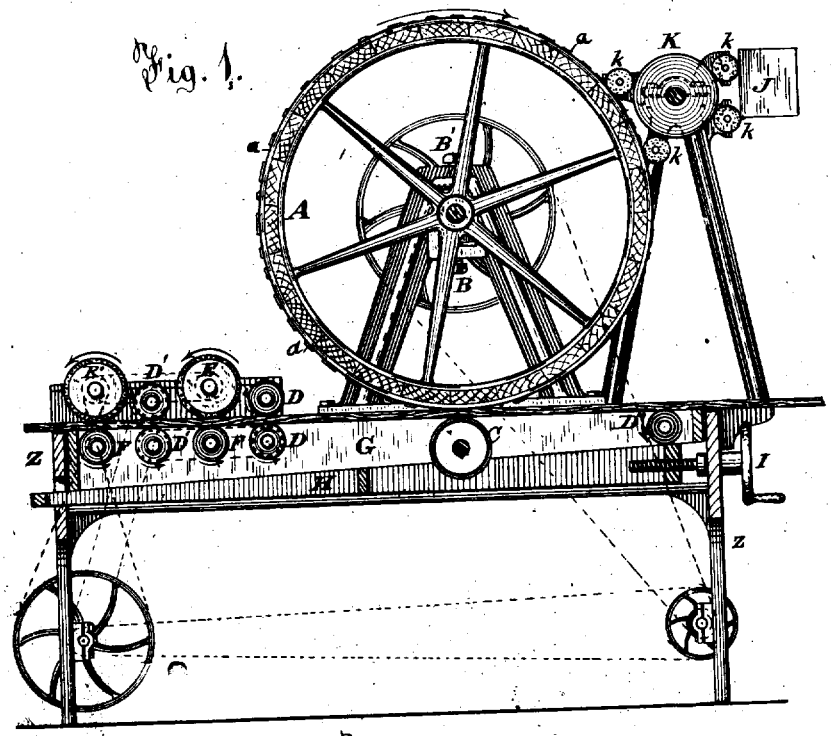
Figure 2:
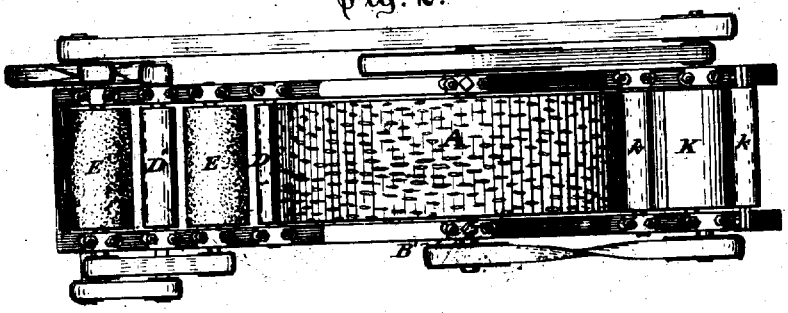
Figure 3:
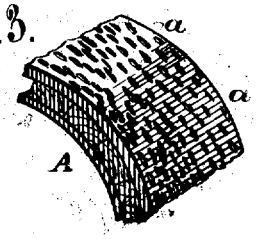

In the accompanying drawings, Figure 1 is a longitudinal section, and Fig. 2 is a top view, of a machine embodying my invention. Fig. 3 represents a part of the face of the graining-drum.

My graining-drum A is of such dimensions as to insure sufficient variety of grain and to operate upon any desired width of board. On the peripheral face of this drum is an electrotyped or engraved plate, *a*, the exact mold or counterpart of whatever grain of wood it may be desired to imitate. Set-screws B B′ enable the drum to be adjusted to produce any desired depth of grain-impressions, the screw B serving to limit such depth, and the screw B′ to aid the weight of the drum itself in imparting sufficient pressure. Where, however, the weight of the drum is found to suffice for the effective pressure, the upper screw, B′, may be elevated out of contact. Immediately below the drum is a revolving or other suitable bed or bearer, C. This bearer may possess any of the forms familiar in machines for dressing lumber, and, as in such machines, either it or the operative member A must be capable of yielding to irregularities of thickness of the stuff and of exerting a pressure thereupon, and, as in such machines, either or both members may be positively rotated, so as to discharge the functions of a feed.

In order that the drum A at the instant of indenting may impart the desired color to the indentations, I arrange in contact with its periphery a color-imparting apparatus, which is substantially as follows: J is a tank, suitably secured to the frame, and containing the desired dye, stain, or color material. This tank and the rollers K *k* for transferring the color in suitable quantities to the summits of the protuberances on the drum-face are similar to the apparatus employed in inking the type in printing-machines.

In addition to the above essential members there may be employed other devices, as follows: One or more pairs of feed-rollers, D D D′ D′, may be employed, so geared that their peripheries will move in unison with the indenting-drum A. Such feed-rollers may be provided on either or both sides of the drum. Thus, the receiving end of the machine may have one or more rollers, D″, to support and facilitate the entrance of the stuff, or one or more pairs of feed-rollers like those represented on the delivery side. There may be also employed one or more finishing-rollers, E E′, clothed around their peripheries with canvas, india-rubber, leather, or other suitable substance somewhat elastic. These rollers are so geared as to rotate at a high speed in contrary direction to the feed. Journaled underneath each finishing-roller is a rotary bed, F.

All the supporting members, C D D′ D″ F, may be journaled in a frame, G, capable of vertical adjustment, said frame having for that purpose inclined lower edges, and being confined to a vertical path by the main frame Z, and resting upon a correspondingly-inclined surface of a frame, H, shiftable horizontally by means of a screw, I. This arrangement enables all the members which constitute the bed of the machine to be simultaneously elevated or depressed to any desired level to accommodate thickness of the stuff.

The above-described apparatus may constitute an attachment for or be used in direct connection with a planing or other wood-working machine.

Before the described action of the engraved and colored drum the lumber may have imparted to it any desired ground or body stain, combined with any vehicle known to furniture-finishers, such as glue, paste, varnish, and the like.

I do not claim, separately considered, a cylindrical surface capable of producing indented grain effects; nor do I claim one capable of imparting color-marks merely.

I claim as new and of my invention—

1. In a wood-graining machine, a cylinder, A, provided with an engraved or embossed periphery in counterpart of the grain to be imitated, in combination with, and arranged in contiguity to, the described color-imparting device K *k*, whereby the cylinder is adapted to simultaneously indent and color the so-indented parts of a board suitably fed and pressed against it.

2. In a wood-graining machine, the drum A, having on its peripheral face the plate *a*, presenting the counter-impression of the grain to be imitated, in combination with the described rollers K *k* near the upper part of said drum, for supplying coloring-matter to the said plate, and the described rolling support C, substantially as set forth.

3. In a wood-graining-machine, the combination of engraved or embossed drum A *a*, feed-rollers D D′ D″, filling and finishing rollers E E′, and bed-rollers F F′, as and for the purpose specified.

4. The process of ornamenting surfaces which consists in impressing the surface of a board with indentations and by the same operation coloring such indentations so as to resemble cedar or other wood grain, substantially as set forth.

In testimony of which invention I hereunto set my hand.

GEO. PELSTRING.

Witnesses:
GEO. H. KNIGHT,
W. T. JUDKINS.